United States Patent [19]

Blount

[11] 4,096,121

[45] Jun. 20, 1978

[54] PROCESS FOR THE PRODUCTION OF RESINOUS PRODUCTS BY CHEMICALLY REACTING SILICIC ACID WITH POLY(VINYL ACETATE) POLYMER

[76] Inventor: David H. Blount, 5450 Lea St., San Diego, Calif. 92105

[21] Appl. No.: 774,638

[22] Filed: Mar. 4, 1977

[51] Int. Cl.$^2$ ............................. C08F 8/12; C08F 8/28
[52] U.S. Cl. ..................................... 260/66; 260/73 L; 260/73 R; 260/29.6 B; 260/29.6 H; 260/825; 260/826; 260/827; 428/452; 526/9; 526/10
[58] Field of Search ............. 526/9, 10; 260/66, 73 L

[56] References Cited

U.S. PATENT DOCUMENTS 2,306,222  12/1942  Patnode ............................... 117/106
2,441,066  5/1948  Hanford ............................... 260/46.5

Primary Examiner—Stanford M. Levin

[57] ABSTRACT

A dry granular alkali metal silicate is chemically reacted with a concentrated mineral acid or an acid hydrogen containing salt to produce a white granular silicic acid compound which will react chemically with a poly(vinyl acetate) polymer by heating the mixture with an alkali catalyst to produce a mixture of poly(vinyl silicate) resin, poly(vinyl alcohol silicate) resin, poly(vinyl acetate silicate) resin and poly(vinyl alcohol) polymer.

11 Claims, No Drawings

PROCESS FOR THE PRODUCTION OF RESINOUS PRODUCTS BY CHEMICALLY REACTING SILICIC ACID WITH POLY(VINYL ACETATE) POLYMER

BACKGROUND OF THE INVENTION

This invention relates to a process for production of resinous products such as poly(vinyl silicate) resin, poly(vinyl alcohol silicate) resin and poly(vinyl acetate silicate) resin by chemically reacting a silicic acid compound with poly(vinyl acetate) polymer.

The silicic acid compound used in this process may be produced by chemical reaction of a dry alkali metal metasilicate with a mineral acid or an acid hydrogen containing salt. The white granular silicic acid is washed with water, filtered, and then air dried at 25° to 75° C. The white granular silicic acid was analyzed by Infrared Analysis, using the IR KBr disc method. The Infrared Analysis was very similar to that obtained with Mallinckrodt's hydrated silica except for the area which shows the presence of Si-H bonds. The Mallinckrodt's hydrated silica ($SiO_2.xH_2O$) has a molecular weight of $60.09.xH_2O$. The said silicic acid contains an active hydrogen which will reduce silver nitrate in an aqueous solution which is evidence that Si—H bonds are present.

When the said silicic acid is heated to much above 105° C, silicon dioxide with a molecular weight of about 60 is produced. On further heating, it has a melting point of 1650° C. In cryoscopic and ebullioscopic determination, the silicic acid produced was not soluble in any common organic solvent but was readily soluble in dilute alkali metal hydroxide aqueous solutions.

The molecular weight was determined from the boiling point elevation of said silicic acid in a 6N sodium hydroxide solution and indicated a molecular weight of 78 ± 25 gm/mol. This type of reactive solution normally changes the molecular species. However, this would seem to indicate the absence of a polymeric form of silicate. This analysis may indicate a possible formula of $HSi(OH)_3$ (orthosilicoformic acid) and the presence of metasilicic acid ($H_2SiO_3$) while in solution. The orthosilicoformic acid, when dried, will lose water to form silicoformic acid (H.SiO.OH).

To produce the silicic acid compound used in these Examples it is necessary to use a dry alkali metasilicate instead of using an aqueous solution of an alkali metal metasilicate. Hydrated silica ($SiO_2.xH_2O$) produced by any of the common known methods may be used in this instant process.

The silicic acid will chemically react with poly(vinyl acetate) polymer in the presence of an alkali compound by heating the mixture, thereby producing various resins such as poly(vinyl silicate), poly(vinyl acetate silicate), poly(vinyl alcohol silicate), and poly(vinyl alcohol). The poly(vinyl alcohol) polymer produced may be reacted chemically with silicic acid to produce poly(vinyl silicate) polymer and poly(vinyl alcohol silicate) polymer. The various polymers may be separated by using various organic and aqueous solvents.

The exact course of the reaction which take place during the process to produce the said polymer cannot be determined with 100% certainty.

When 4 parts of a poly(vinyl acetate) emulsion, containing about 2 parts by weight of poly(vinyl acetate) polymer, are mixed with 1.5 parts by weight of dry granular silicic acid and then heated in the presence of an alkali catalyst until the water evaporates and until the softening temperature of poly(vinyl acetate) polymer is reached, it produces a mixture of poly(vinyl silicate) resin, poly(vinyl acetate silicate) resin, poly(vinyl alcohol silicate) resin and poly(vinyl alcohol) polymer. About 40 to 50% of the resin produced is not soluble in any of the common poly(vinyl acetate) polymer solvents and on chemical analysis of its silicon content as silicon dioxide it contains 30 to 40% by weight of silicon dioxide. About 40 to 50% of the resin produced is soluble in the common poly(vinyl acetate) polymer solvents and on chemical analysis of its silicon content as silicon dioxide it contains 20 to 30% by weight of silicon dioxide. About 10 to 15% of the resin produced is soluble in water and on chemical analysis of its silicon content as silicon dioxide it contains about 20 to 30% silicon dioxide. About 15 to 30% of the silicic acid does not chemically react with the poly(vinyl acetate) polymer.

The resinous products produced contain various ratios of acetate, hydroxyl and silicate groups. The degree of alcoholysis and acetalization can be controlled so that resinous products having various ratios of acetate, hydroxyl, and acetal groups, are obtained.

The poly(vinyl acetate silicate) resin may be converted to poly(vinyl alcohol silicate) polymer by the use of a caustic or mineral acid catalyst in an alcohol.

The polymers and resins produced by this method may be used as coatings, adhesives and molding compounds, may be extruded in the form of tubes, rods, sheets and threads, and may be used in the production of films.

The poly(vinyl alcohol silicate) resins are quite reactive chemically. They may be reacetylated by heating with acetic anhydride in pyridine. They can also be esterified with other acids, acid chlorides, anhydrides, dibasic acids, aldehydes and ketones. They may be chemically reacted with diisocyanates, phenol-formaldehyde resins, melamine-formaldehyde resins and dimethylol urea. To decrease the water solubility, it may be chemically reacted with chromium compounds, diazo compounds, copper-ammonia complexes and zinc-ammonia complexes.

SUMMARY OF THE INVENTION

I have discovered that a silicic acid compound produced by the chemical reaction of a dry alkali metal metasilicate with a concentrated mineral acid or an acid hydrogen containing salt will react chemically with poly(vinyl acetate) and poly(vinyl alcohol) polymers. Best results are obtained when about 1 part by weight of silicic acid is reacted with 1.5 to 3 parts by weight of poly(vinyl acetate) polymer or poly(vinyl alcohol) polymer.

The poly(vinyl acetate) polymer may be produced by any well known method and may be used in the form of a powder, granules or in the form of aqueous dispersions. The aqueous dispersion of poly(vinyl acetate) polymer is preferred in this instant process. The poly(vinyl alcohol) polymer is produced by this instant process but may also be produced by any of the well known methods. The molecular weight of the poly(vinyl acetate) polymer may vary greatly when used in this process.

Various alkaline metal and alkali metal metasilicates may be used in the process but dry granular sodium metasilicate is preferred.

Various mineral acids and acid hydrogen containing salts may be used in this process to produce the silicic acid, but concentrated sulfuric acid and sodium hydrogen sulfate are preferred.

Any suitable catalyst may be used to initiate, promote or modify the chemical reaction. Acid catalysts yield poorer results than do alkali catalysts, therefore alkali catalysts are preferred in this process.

Various alkali compounds such as alkali metal carbonates, hydroxides, oxides and alkali metal salts of weak acids may be used as the catalyst in the chemical reaction to produce resinous products such as poly(vinyl silicate), poly(vinyl acetate silicate), poly(vinyl acetate alcohol silicate), poly(vinyl alcohol silicate) and poly(vinyl alcohol) resins. The most useful alkali metal hydroxides are sodium hydroxide and potassium hydroxide. The most useful alkali metal carbonates are sodium and potassium carbonates. Sodium silicate may also be used as the catalyst. Best results are obtained when the alkali catalyst is added in the amount of 1% to 10% of the weight of the reactants, silicic acid compound and poly(vinyl acetate) polymer or poly(vinyl alcohol) polymer. The preferred alkali catalyst is sodium carbonate.

The resinous product, poly(vinyl acetate silicate) resin may be converted to poly(vinyl alcohol silicate) by adding the poly(vinyl acetate silicate) resin to ethanol, containing a small amount of sulfuric acid. The poly(vinyl alcohol silicate) resin is soluble in the ethanol. Aldehydes and ketones may be added to the solution of poly(vinyl alcohol silicate) resin, thereby chemically reacting with the poly(vinyl alcohol silicate) resin to produce poly(vinyl aldehyde silicate) resins or poly(vinyl ketal silicate) resins.

Various aldehydes may be reacted with the resinous product, poly(vinyl alcohol silicate) resin such as formaldehyde, acetaldehyde, butyraldehyde, acrolein, crotonaldehyde, propionaldehyde, acrylic aldehyde and mixtures thereof.

Various ketones may be reacted chemically with the resinous product, poly(vinyl alcohol silicate) resin such as acetone, methyl ethyl ketone, diethyl ketone, methyl propyl ketone, ethyl propyl ketone, methyl amyl ketone, cyclohexanone and mixtures thereof.

The primary object of the present invention is to produce resinous products from the chemical reaction of silicic acid and poly(vinyl acetate) polymer. Another object is to produce poly(vinyl alcohol) polymer which may be converted to poly(vinyl alcohol silicate) resins. Another object is to produce poly(vinyl alcohol silicate) resins. Still another object is to produce poly(vinyl alcohol silicate) resins that will react chemically with ketones to produce poly(vinyl ketal silicate) resins. A further object is to produce a resinous product, poly(vinyl acetate silicate) resin, which is soluble in organic solvents and can be painted on wood to form a tough protective coating.

DESCRIPTION OF PREFERRED EMBODIMENTS

My invention will be illustrated in greater detail by the specific Examples that follow, it being understood that these preferred embodiments are illustrative of, but not limited to, procedures which may be used in the production of resinous products by the chemical reaction of silicic acid with poly(vinyl acetate) polymer. Parts and percentages are by weight unless otherwise indicated.

EXAMPLE I

About 15 parts by weight of granular sodium metasilicate pentahydrate are slowly added to about 8 parts by weight of concentrated sulfuric acid while agitating and keeping the temperature below 100° C. The reaction takes place under ambient pressure; oxygen is evolved and the reaction is complete in 1 to 2 hours, thereby producing a white granular silicic acid compound and sodium sulfate. The mixture is washed with water, filtered to remove the salt and water, thereby recovering the silicic acid compound. The silicic acid compound is air dried at 25° to 75° C.

About 3 parts by weight of the silicic acid compound, about 4 parts by weight of poly(vinyl acetate) polymer in an aqueous dispersion and about 1 part by weight of sodium carbonate are mixed then heated to 70° to 110° C for 20 to 60 minutes while agitating. The water is evaporated and the polymer is heated to the softening point, thereby producing a cream colored, resinous compound.

The resinous compound is ground into small granules and boiled in water. About 10% of the resinous compound is soluble in water. The resinous compound is placed in acetone and about 50% is soluble and on chemical analysis of its silicon content as silicon dioxide it contains about 20% silicon dioxide. The remaining 40% is not soluble in any of the known poly(vinyl acetate) polymer solvents and on chemical analysis of its silicon content as silicon dioxide it contains about 30% silicon dioxide. About 20% of the silicic acid does not chemically react with the poly(vinyl acetate) polymer.

The water soluble portion contains mainly poly(vinyl alcohol). About equal parts by weight of the poly(vinyl alcohol) and silicic acid are mixed in enough water to dissolve the poly(vinyl alcohol). The mixture is then heated to 70° to 110° C for 20 to 60 minutes, evaporating the water and heating the poly(vinyl alcohol) polymer to the softening point while agitating, thereby producing a resinous compound, poly(vinyl alcohol silicate), and on chemical analysis of its silicon content as silicon dioxide it contains 40% silicon dioxide. About 25% of the silicic acid was filtered out of an aqueous solution of the resinous compound, poly(vinyl alcohol silicate). About 20% of this resinous compound is not soluble in water and on chemical analysis of its silicon content as silicon dioxide it contains about 45% silicon dioxide.

There are four basic types of resins produced by this method:

(1) Poly(vinyl acetate silicate) resin that is not soluble in poly(vinyl acetate) solvents,
(2) Poly(vinyl acetate silicate) resin that is soluble in poly(vinyl acetate) solvents,
(3) Poly(vinyl alcohol silicate) resin that is soluble in water,
(4) Poly(vinyl alcohol silicate) resin that is not soluble in water or in most organic solvents.

Type 1 poly(vinyl acetate silicate) resin has a softening temperature of 80° to 190° C and may be molded into useful objects.

Type 2 poly(vinyl acetate silicate) resin is soluble in acetone and other organic solvents, and a solution of the resin may be used as a protective coating on wood and metal, and form films.

Type 3 poly(vinyl alcohol silicate) resin in an aqueous solution may be used as an adhesive, as a coating agent and to form films.

Type 4 poly(vinyl alcohol silicate) resin will soften with heat and may be molded into useful objects. Glycerol may be used as the plasticizer.

EXAMPLE II

About 3 parts by weight of the silicic acid as produced in Example I, about 5 parts by weight of poly(vinyl acetate) polymer in an aqueous dispersion and 0.5 parts by weight of sodium carbonate are mixed then heated to 70° to 110° C while agitating for 20 to 60 minutes. The water is evaporated and the poly(vinyl acetate) polymer is heated to the softening point, thereby producing a resinous compound, poly(vinyl acetate silicate) resin and poly(vinyl alcohol) polymer.

The resinous compounds are then ground into granules and agitated in hot water for 10 to 20 minutes. About 10% of the resinous compound is soluble in water.

About 2 parts by weight of the water soluble, resinous compound, poly(vinyl alcohol) polymer, in about 3 parts of water, and about 1.5 parts by weight of the silicic acid compound are mixed then heated for 20 to 60 minutes while agitating, evaporating the water and heating the resinous compound to the softening temperature, thereby producing poly(vinyl alcohol silicate) resin.

EXAMPLE III

About 3 parts by weight of silicic acid as produced in Example 1, 9 parts by weight of an aqueous dispersion, containing about 4 parts by weight of poly(vinyl acetate) polymer, and 0.5 parts by weight of potassium carbonate are mixed then heated to 70° to 110° C for 20 to 60 minutes while agitating. The water is evaporated and the mixture is heated to the softening temperature of poly(vinyl acetate) polymer, thereby producing a resinous compound, containing poly(vinyl acetate silicate) resin and poly(vinyl alcohol) polymer.

The resinous product is ground into fine granules and heated in a dilute sodium hydroxide solution; the unreacted silicic acid goes into solution. The silicic acid is then precipitated with an acid. About 25% of the silicic acid does not react chemically with the poly(vinyl acetate) polymer.

EXAMPLE IV

About 3 parts by weight of a dry granular silicic acid, 4 parts by weight of a granular poly(vinyl acetate) polymer, and 0.5 parts by weight of sodium hydroxide are mixed in about 15 parts by weight of water, then heated to 70° to 110° C for 20 to 60 minutes while agitating until the water is evaporated and the poly(vinyl acetate) polymer is softened. The silicic acid is mixed well with the softened polymer, thereby producing a resinous product, poly(vinyl acetate silicate) resin, poly(vinyl alcohol silicate) resin and poly(vinyl alcohol) polymer. The resinous product is ground into granules and then placed in hot water. The poly(vinyl alcohol silicate) resin and poly(vinyl alcohol) polymer are soluble in water and are filtered off, thereby recovering the poly(vinyl acetate silicate) resin. The poly(vinyl alcohol silicate) resin and poly(vinyl alcohol) polymer are recovered by evaporating the water or they may be precipitated from the water.

The aqueous solution of the resinous product is further reacted with silicic acid by adding 3 parts by weight of silicic acid to the aqueous solution, containing 5 parts by weight of the resinous product. The mixture is then heated to 70° to 110° C for 20 to 60 minutes while agitating until the water is evaporated, thereby producing poly(vinyl alcohol silicate) resin.

About 40% of the cream colored poly(vinyl alcohol silicate) resin is not soluble in water but will form an emulsion. The portion of the poly(vinyl alcohol silicate) resin which is water soluble, combined with the emulsion portion, may be painted on wood and forms a tough, water resistant, protective coating.

EXAMPLE V

About 3 parts by weight of silicic acid as produced in Example I, 4 parts by weight of poly(vinyl acetate) polymer in an aqueous dispersion, and about 0.5 parts by weight of sodium hydroxide flakes are mixed in about 30 parts by weight of ethanol. The mixture is then heated to 70° to 110° C while agitating and the ethanol is evaporated, thereby producing a resinous product, poly(vinyl acetate silicate) resin and poly(vinyl alcohol) polymer.

About 1 part by weight of the resinous product is added to about 10 parts by weight of ethanol, containing about 0.1 part by weight of sulfuric acid and agitated for 30 minutes; about 40% of the resinous product is soluble in the ethanol. Water is added (about 30 parts by weight) and the mixture is heated to 70° to 110° C until the alcohol evaporated. The resinous product, poly(vinyl alcohol silicate) goes into solution. The solution is filtered and no silicic acid is filtered out.

One part by weight of the resinous product, poly(vinyl alcohol silicate) resin, and one part by weight of a 37% formaldehyde aqueous solution are mixed; then sulfuric acid is added until the ph is 5 to 6. The mixture is heated to 70° to 110° C while agitating at ambient pressure for 20 to 60 minutes, evaporating the water, thereby producing poly(vinyl formal silicate) resin, a tough white resin.

EXAMPLE VI

One part by weight of silicic acid as produced in Example I, about 2 parts by weight of poly(vinyl alcohol) polymer (93% hydrolyzed) and 0.1 part by weight of sodium carbonate are mixed in about 5 parts by weight of water, then heated to 70° to 110° C for 20 to 60 minutes while agitating until the water evaporates and the poly(vinyl alcohol) polymer is heated to its softening temperature, thereby producing a resinous product, poly(vinyl alcohol silicate) resin.

The resin is soluble in hot water, and on filtering, about 5% of the silicic acid is filtered out. After the aqueous solution of the resinous product sits for 24 hrs., about 30% of the resinous product settles to the bottom as a white, tough film.

EXAMPLE VII

About 1 part by weight of dry granular potassium metasilicate, containing less than 6 mols of water per mol of potassium metasilicate, and 12 mols of potassium hydrogen sulfate are mixed. The mixture is agitated at ambient pressure and chemical reaction causes oxygen to evolve in 1 to 3 minutes; considerable heat is produced, the chemical reaction is complete in 1 to 2 hours, thereby producing white granules of a silicic acid compound and potassium sulfate. The mixture is washed with water and filtered to remove the salt. The silicic acid compound is air dired at 25° to 75° C.

One part silicic acid by weight, one part polyvinyl alcohol (93% hydrolized) and 4 parts water by weight are mixed, then heated to 70° to 110° C at ambient pressure for 20 to 60 minutes while agitating and evaporating the water, thereby producing a resinous product, poly(vinyl alcohol silicate) resin. The resin is placed in hot water and it goes into solution. The solution is filtered, and 25 to 30% of the silicic acid is filtered out.

EXAMPLE VIII 2 parts by weight of dry granular silicic acid, 3 parts by weight of polyvinyl alcohol, 0.1 parts by weight of sodium carbonate and 10 parts by weight of water are mixed, then heated to 70° to 110° C at ambient pressure for 20 to 60 minutes while agitating and evaporating the water, thereby producing a resinous product, poly(vinyl alcohol silicate) resin.

One part by weight of the poly(vinyl alcohol silicate) resin and one part by weight of a 37% formaldehyde aqueous solution are mixed, then sulfuric acid is added until the pH is 5 to 6. The mixture is heated to 70° to 110° C while agitating at ambient pressure for 20 to 60 minutes, evaporating the water, thereby producing poly(vinyl formal silicate) resin.

EXAMPLE IX

One part by weight of dry granular silicic acid as produced in Example VII, 2 parts by weight of polyvinyl alcohol, 0.1 part by weight of sodium carbonate, and 8 parts by weight of water are mixed then heated to 70° to 110° C for 20 to 60 minutes, evaporating the water, thereby producing poly (vinyl alcohol silicate) resin.

Two parts by weight of poly(vinyl alcohol silicate) resin, one part by weight of acetaldehyde and 6 parts by weight of water are mixed, then sulfuric acid is added until the pH is 4 to 5. The mixture is then heated to 70° to 110° C while agitating until the water evaporates, thereby producing poly(vinyl acetal silicate) resin.

EXAMPLE X 2 parts by weight of dry granular silicic acid as produced in Example 1, 3 parts by weight of polyvinyl alcohol, 0.2 parts by weight of sodium metasilicate and 10 parts by weight of water are mixed then heated to 70° to 110° C for 20 to 60 minutes while agitating. The water is evaporated and the polyvinyl alcohol is heated to its softening temperature, thereby producing a resinous product, poly(vinyl alcohol silicate) resin.

2 parts by weight of the resinous product, 10 parts by weight of ethanol, 0.1 part by weight of concentrated sulfuric acid and 1 part by weight of acetone are mixed then heated to 70° to 110° C for 20 to 60 minutes, evaporating the ethanol, thereby producing a resinous product, poly(vinyl acetone silicate) resin.

EXAMPLE XI

About 3 parts by weight of dry granular silicic acid gel, 4 parts by weight of polyvinyl alcohol and 5 parts by weight of water are mixed, then heated to 70° to 110° C for 20 to 60 minutes at ambient pressure while agitating. The water is evaporated and the poly(vinyl alcohol) is heated to the softening temperature, thereby producing a resinous product, poly(vinyl alcohol silicate) resin.

About 2 parts by weight of the resinous product, 10 parts by weight of ethanol, about 0.1 part by weight of concentrated sulfuric acid and 1 part by weight of acetaldehyde are mixed, then the mixture is heated to 70° to 110° C for 20 to 60 minutes until the ethanol is evaporated, thereby producing a resinous product, poly(vinyl acetal silicate) resin.

EXAMPLE XII

Poly (vinyl acetate silicate) resin and poly(vinyl alcohol) polymer are produced by the following steps:

(a) mixing about 3 parts by weight of silicic acid as produced in Example I, 3 parts by weight of poly(vinyl acetate) polymer in an aqueous dispersion and 1% by weight of sodium carbonate, percentage based on the weight of the silicic acid and poly(vinyl acetate) polymer;

(b) heating the mixture to 70° to 110° C for 20 to 60 minutes while agitating, thereby (c) producing a cream colored, resinous product;

(d) adding the resinous product to water and dissolving the water soluble portion, then filtering off the water soluble resinous product, poly(vinyl alcohol silicate) resin and poly(vinyl alcohol) polymer.

(e) adding the remaining resinous product to a poly(vinyl acetate) polymer solvent such as ketones, methanol, organic esters, chlorinated hydrocarbons or aromatic hydrocarbons, while agitating for 20 to 30 minutes, then filtering off the solvent soluble resinous product, poly(vinyl acetate silicate) resin, which upon chemical analysis of its silicon content as silicon dioxide contains 20 to 30% silicon dioxide by weight;

(f) recovering the white resinous product, poly(vinyl acetate silicate) resin, and on chemical analysis for the silicon content as silicon dioxide it contains 30 to 40% by weight of silicon dioxide;

(g) evaporating the solvent from the poly(vinyl acetate silicate) resin, thereby recovering poly(vinyl acetate silicate) resin and on chemical analysis for the silicon content as silicon dioxide it contains 20 to 30% silicon dioxide by weight.

EXAMPLE XIII

Poly (vinyl acetate silicate) resin and poly(vinyl alcohol) polymer are produced by the following steps:

(a) mixing about 3 parts by weight of silicic acid as produced in Example 1, 6 parts by weight of poly(vinyl acetate) polymer in an aqueous dispersion and 10% by weight of potassium carbonate, percentage based on the weight of the silicic acid and poly(vinyl acetate) polymer;

(b) heating the mixture to 70° to 110° C for 20 to 60 minutes while agitating, thereby (c) producing a cream colored, resinous product;

(d) adding the resinous product to water and dissolving the water soluble resin, poly(vinyl alcohol and poly(vinyl alcohol silicate) resin;

(e) adding the remaining resinous product to 20 parts by weight of methanol while agitating for 20 to 60 minutes, thereby dissolving the poly(vinyl acetate silicate) resin, and on chemical analysis of its silicon content as silicon dioxide it contains 20 to 30% by weight of silicon dioxide, and filtering off the solution of poly(vinyl acetate silicate) resin, thereby (f) recovering the white resinous product, poly(vinyl acetate silicate) resin, containing 30% to 40% silicon dioxide by weight;

(g) evaporating the organic solvent, methanol, thereby recovering the poly(vinyl acetate silicate) resin and on chemical analysis of its silicon content as silicon dioxide it contains 20 to 30% silicon dioxide by weight.

EXAMPLE XIV

Poly(vinyl butyral silicate) resin is produced by the following steps:

(a) mixing about 2 parts by weight of a dry granular silicic acid, 3 parts by weight of poly(vinyl alcohol) polymer (93% hydrolyzed), 0.1 parts by weight of sodium carbonate and 10 parts by weight of water;

(b) heating the mixture to 70° to 110° C for 20 to 60 minutes while agitating, thereby (c) producing poly(vinyl alcohol silicate) resin;

(d) mixing 2 parts by weight of the poly(vinyl alcohol silicate) resin, 10 parts by weight of ethanol, 0.1 part by weight of concentrated sulfuric acid (70 to 90%) and 1 part by weight of butyraldehyde;

(e) heating the mixture to 70° to 110° C for 20 to 60 minutes while agitating thereby evaporating the ethanol and (f) producing poly(vinyl butyral silicate) polymer.

EXAMPLE XV

Poly(vinyl crotonal silicate) resin is produced by the following steps:

(a) mixing about 3 parts by weight of silicic acid as produced in Example I, 5 parts by weight of poly(vinyl acetate) polymer in an aqueous dispersion and 0.5 parts by weight of sodium carbonate;

(b) heating the mixture to 70° to 110° C for 20 to 60 minutes while agitating, thereby (c) producing a cream colored, resinous product;

(d) adding the resinous product to about 20 parts by weight of ethanol containing 0.1 parts by weight of concentrated sulfuric acid while agitating, the resinous product goes into solution;

(e) adding about 3 parts by weight of crotonaldehyde while agitating for 10 to 30 minutes thereby (f) precipitating out a white resinous product poly(vinyl crotonal silicate) resin.

EXAMPLE XVI

Poly(vinyl methyl ethyl ketone silicate) resin is produced by the following steps:

(a) mixing about 3 parts by weight of silicic acid, 6 parts by weight of poly(vinyl alcohol) polymer, 0.2 parts by weight of sodium carbonate;

(b) heating the mixture to 70° to 110° C for 20 to 60 minutes while agitating at ambient pressure, thereby (c) producing a resinous product, poly(vinyl alcohol silicate) resin (d) adding 2 parts by weight of the resinous product, poly(vinyl alcohol silicate) resin and 1 part by weight of methyl ethyl ketone to about 10 parts by weight of ethanol containing about 0.1 parts by weight of concentrated sulfuric (e) heating the mixture to 70° to 110° C for 20 to 60 minutes while agitating thereby evaporating the ethanol and (f) producing poly(vinyl methyl ethyl ketone silicate) resin.

Although certain specific preferred ingredients and conditions are described in conjunction with the above detailed description of the Invention and Examples, these may be varied and other ingredients may be used where suitable, with similar results. For example, various cross-linking or modifying agents may be used.

Other applications, modifications and ramifications of this invention will occur to those skilled in the art upon reading this disclosure, these are intended to be included within the scope of this invention, as defined in the appended claims.

I claim:

1. The process for the production of poly(vinyl acetate silicate) and poly(vinyl alcohol silicate) resinous products by the following steps:

(a) mixing about 3 parts by weight of silicic acid, 3 to 6 parts by weight of poly(vinyl acetate) polymer in an aqueous dispersion and 1% to 10% by weight of an alkali catalyst; percentage is based on the weight of the silicic acid and poly(vinyl acetate) polymer;

(b) heating the mixture to 70° to 110° C for 20 to 60 minutes while agitating, thereby (c) producing a cream colored, resinous product;

(d) adding the resinous product to water and dissolving the water soluble, resinous product, poly(vinyl alcohol) polymer, thereby (e) recovering the white, resinous product, poly(vinyl acetate silicate) resin.

2. The method of claim 1, including the further steps of:

(a) mixing 1 part by weight of silicic acid, 1 to 2 parts by weight of the water soluble, resinous product, poly(vinyl alcohol) resin, 1% to 10% alkali catalyst by weight, percentage based on the weight of silicic acid and poly(vinyl alcohol) resin, and 5 to 10 parts by weight of water;

(b) heating the mixture to 70° to 110° C for 20 to 60 minutes while agitating, thereby (c) producing a resinous product, poly(vinyl alcohol silicate) resin.

3. The method of claim 1 wherein the alkali catalyst is selected from the group consisting of sodium carbonate, potassium carbonate, sodium hydroxide, potassium hydroxide and mixtures thereof.

4. The method of claim 2 wherein the alkali catalyst is selected from the group consisting of sodium carbonate, potassium carbonate, sodium hydroxide, potassium hydroxide and mixtures thereof.

5. The method of claim 2, including the further step of adding one part by weight of the resinous product, poly(vinyl alcohol silicate) resin, 10 parts by weight of ethanol 0.5 to 1 part by weight of an aldehyde and about 0.1 part by weight of concentrated sulfuric acid, then heating the mixture to 70° to 110° C for 20 to 60 minutes while agitating, thereby producing a resinous compound, poly(vinyl acetal silicate) resin.

6. The method of claim 5 wherein the aldehyde is selected from the group consisting of formaldehyde, acetaldehyde, butyraldehyde, acrolein, propionaldehyde, crotonaldehyde and mixtures thereof.

7. The method of claim 2, including the further step of adding about 1 part by weight of the resinous product, poly(vinyl alcohol silicate) resin, about 0.5 to 1 part by weight of an organic ketone, 10 parts by weight of ethanol and about 0.1 parts by weight of concentrated sulfuric acid, then heating the mixture to 70° to 110° C for 20 to 60 minutes while agitating, thereby producing a resinous product, poly(vinyl ketal silicate) resin.

8. The method of claim 7 wherein the ketone is selected from the group consisting of acetone, cyclohexanone, methyl ethyl ketone, diethyl ketone, methyl propyl ketone, ethyl propyl ketone, dipropyl ketone and mixtures thereof.

9. The method of claim 1, including the further step of adding about one part by weight of the resinous product, poly(vinyl acetate silicate) resin to about 10 parts by weight of ethanol, containing about 0.1 part by weight of concentrated sulfuric acid, then heating the mixture to 70° to 110° C while agitating until ethanol and acetic acid evaporates, thereby producing a resinous product, poly(vinyl alcohol silicate) resin.

10. The method of claim 1, including the further steps of:
(a) adding one part of the resinous product, poly(vinyl acetate silicate) resin to about 10 parts by weight of ethanol, containing about 0.1 part by weight of sulfuric acid and 0.5 to 1 part by weight of an aldehyde;
(b) mixing the mixture for 20 to 60 minutes; the poly(vinyl acetate silicate) resin goes into solution, then is precipitated, thereby producing poly(vinyl aldehyde silicate) resin.

11. The method of claim 10 wherein the aldehyde is selected from the group consisting of formaldehyde, acetaldehyde, butyraldehyde, acrolein, propionaldehyde, crotonaldehyde and mixtures thereof.

* * * * *